United States Patent [19]

Carlin et al.

[11] Patent Number: 5,059,675

[45] Date of Patent: Oct. 22, 1991

[54] SURFACE SIZING COMPOSITION

[75] Inventors: William W. Carlin, Corpus Christi, Tex.; Sai H. Hui, Hudson; John D. Mansell, Akron, both of Ohio

[73] Assignee: PPG Industries, Inc., Pittsburgh, Pa.

[21] Appl. No.: 270,553

[22] Filed: Nov. 14, 1988

[51] Int. Cl.$^5$ .................. C08G 12/30; B32B 27/42
[52] U.S. Cl. ................. 528/254; 428/524; 428/526; 428/528; 428/530; 106/287.2; 252/8.75; 252/542
[58] Field of Search ............ 528/254; 106/287.2; 428/524, 526, 528, 530; 252/8.75, 542

[56] References Cited

U.S. PATENT DOCUMENTS

| | | | |
|---|---|---|---|
| 2,509,174 | 5/1950 | Scott et al. | 528/254 |
| 4,013,627 | 3/1977 | Temple | 526/245 |
| 4,044,178 | 8/1977 | Abel et al. | 427/373 |
| 4,452,934 | 6/1984 | Swafford | 524/243 |
| 4,497,934 | 2/1985 | Streetman | 528/254 |

FOREIGN PATENT DOCUMENTS 1203159  9/1986  Japan .................. 528/254

*Primary Examiner*—Kriellion Morgan
*Attorney, Agent, or Firm*—Edward J. Whitfield; George D. Morris

[57] ABSTRACT

Disclosed are compositions useful as surface coatings for nonwoven substrates which compositions are reaction products of a melamine formaldehyde compound, long chain saturated alcohols and long chain saturated or unsaturated polyethoxylated alcohols. The invention compositions when used to surface size paper impart oil, water and polar solvent resistance thereto. The compositions may be used alone or as substantial replacements for anionic or non-ionic fluorocarbon based surface sizes that are typically used to impart oil resistance to paper.

11 Claims, No Drawings

SURFACE SIZING COMPOSITION

FIELD OF THE INVENTION

This invention relates to surface sizing compositions which are reaction products of melamine formaldehyde compound with long chain saturated or unsaturated alcohol and polyethoxylated alcohol. The sizing compositions of the invention impart oil, water and polar solvent resistant properties to paper, paperboard and other nonwoven substrates.

BACKGROUND OF THE INVENTION

A variety of chemical surface treatments are used in the paper making industry to impart various properties to the finished paper. Resistance to oil penetration is a particularly desirable property for paper products intended for use as packaging for fatty or greasy materials, for example, fatty or greasy food products. Typically, fluorocarbon compounds are employed as surface sizes or coatings to impart oil penetration resistance. A comprehensive discussion of the use of fluorocarbon compounds, both as internal as well as surface sizes, to impart oil resistance to paper is found in TAPPI Monograph No. 33 by Rengel and Young, pp. 170-188 (1971).

Fluorocarbon surface sizes, though effective, are quite expensive and available from only a few manufacturers, e.g., the proprietary fluorocarbon sizes sold by 3M Company under the "Scotchban" tradename.

It has now been found that certain melamine based compositions when applied as surface coatings to paper impart, inter alia, oil penetration resistance to the paper. These melamine based compositions can be used alone or can be used to replace a substantial portion of the considerably more expensive fluorocarbon sizes, while still maintaining the high level of oil resistance obtained from the fluorocarbon sizes alone.

THE INVENTION

This invention provides a composition comprising the reaction product of melamine formaldehyde compound, long chain alcohols and long chain polyethoxylated alcohols. When surface coated on nonwoven substrated, e.g. paper, the compositions of the invention impart oil, polar solvent and water penetration resistance to the substrate. The compositions of the invention are particularly effective when used in combination with fluorocarbon based surface sizes, enabling use of a substantially lesser amount of fluorocarbon size while obtaining at least equivalent oil penetration resistance than would obtain if more fluorocarbon size were used alone. For example, contact angle measurements of corn oil and oil/water emulsion droplets on paper surface sized with mixtures of commercially used non-ionic or anionic fluorocarbon sizes and compositions of the invention show that the invention composition can replace up to 60 percent of the expensive fluorocarbon size typically used to surface size paper and still retain excellent oil penetration resistance and in addition, impart excellent water and polar solvent penetration resistance; which water and solvent penetration resistance do not obtain from the use of fluorocarbon size alone.

More particularly, the compositions of the invention comprise the reaction product of from about 10 to about 30 weight percent of melamine formaldehyde compound having from 3 to 6 methoxymethyl groups, from about 20 to about 75 weight percent of at least one $C_{12}$ to $C_{30}$ alcohol and from about 5 to about 35 weight percent of at least one $C_{30}$ to $C_{120}$ polyethoxylated alcohol containing from 5 to 50 ethylene groups.

The melamine formaldehyde compound, long chain alcohols and long chain polyethoxylated alcohols are known compounds and are commercially available. A preferred melamine formaldehyde compound is hexamethoxymethyl melamine supplied by American Cyanamid Company under the tradename, Cymel 303. Preferred alcohols are, for example, stearyl alcohol supplied by Sherex Chemical Company under the tradename, Aldol 20NF and a mixture of $C_{20}$ to $C_{24}$ alcohols supplied by Vista Chemical Company under the tradename, Alfol 20+. Exemplary of preferred polyethoxylated alcohols are polyethoxylated lauryl ether and polyethoxylated oleyl ether supplied by the Mazer Chemical business unit of PPG Industries, Inc. under the tradenames, Macol LA-23 and Macol OA-20, respectively.

A preferred composition of the invention comprises the reaction product of from about 30 to about 50 weight percent steary alcohol, from 0 to about 50 weight percent $C_{20}$ to $C_{24}$ alcohols, from about 5 to about 10 weight percent polyethoxylated lauryl ether or polyethoxylated oleyl ether and from about 15 to about 20 weight percent of hexamethoxymethyl melamine.

A particularly preferred composition of the invention comprises about 37 to 38 weight percent stearyl alcohol, about 37 to 38 weight percent $C_{20}$ to $C_{24}$ alcohols, from 7 to 8 weight percent polyethoxylated oleyl alcohol and 17.5 to 18.5 weight percent hexamethoxymethyl melamine.

The compositions of the invention are readily prepared by melting the normally solid alcohols and polyethoxylated alcohols and mixing the alcohol melt with the liquid hexamethoxymethyl melamine. The reaction mixture is heated to a moderate temperature, i.e. about 65° C.-75° C. and mineral acid, preferably concentrated hydrochloric acid, is added to initiate the reaction. The amount of hydrochloric acid used typically does not exceed about 0.1 weight percent basis total weight of reaction mixture. (To prevent crosslinking care must be taken that the acid does not directly contact the pure hexamethoxymethyl melamine.) After acid addition the temperature is raised to about 130° C.-150° C. and maintained thereat for about 1 to 2 hours, methanol and water being removed by vacuum distillation.

The invention is further illustrated by the following examples.

EXAMPLE I

To a 5-liter capacity 3-necked flask provided with a thermometer, a mechanical stirrer and a condenser was charged 1234.4 grams of stearyl alcohol (Aldol 20NF obtained from Sherex Chemical Company). The stearyl alcohol was melted by gradually raising the temperature of the flask by means of a heating mantle provided with a thermowatch. To the molten stearyl alcohol were charged, with stirring, 1232.7 grams of a molten mixture of $C_{20}$-$C_{24}$ saturated alcohols (Alfol 20+ obtained from Vista Chemical Company), 246.8 grams of polyethoxylated oleyl ether (Macol OA-20 obtained from Mazer Chemical Company) and 576.3 grams of hexamethoxymethyl melamine (Cymel 303 obtained from American Cyanamid Company). The reaction mixture was heated to about 70° C., a 200 millimeter Hg vacuum was applied for about 1 minute and 3.3 grams of concentrated hydrochloric acid was added to initiate reaction. The reaction mixture was then gradually heated to a temperature of about 142° C. over an about 2-hour period. An about 100 millimeter Hg vacuum was then applied for about 30 minutes to draw off volatiles. After cooling, 3122.7 grams of desired product were obtained. Gel permeation chromotography of a composition prepared in a manner analagous to the foregoing indicated 6.8 area percent molecular weight below 500 and 4.1 percent between 500 and 1000. The number average molecular weight was about 1200.

EXAMPLE II 20.017 grams of the composition prepared as described in Example I was charged to a first beaker which placed in a water bath maintained at about 80° C. To a second beaker was charged 0.593 grams of polyethoxylated oleyl ether (Macol OA-20 obtained from Mazer Chemical Co.) and 38.315 grams of deionized water. The second beaker was also warmed in the 80° C. water bath. The contents of the second beaker was added to the first beaker and the mixture was ultrasonically homogenized for about 2 minutes, resulting in a stable, very fluid emulsion.

EXAMPLE III

The emulsion prepared as described in Example II, commercial fluorocarbon size (Scotchban FC-829 obtained from 3M Company) as well as mixtures thereof were evaluated for surface repellency to various fluids, as follows.

The test used to evaluate surface repellency is a variation of the "3M Kit Test" (TAPPI UM 557). Generally speaking, the test consists of preparing a series of test liquids of decreasing surface tension. Five drops of each of the test liquids are placed on the surface of a sized paper specimen. After 5 minutes the area of the specimen under each drop is examined to determine the extent of darkening of the test area, repellency being rated on a scale of from 0 (complete wetting and saturation) to 5 (non-wettable). Results are reported as the average rating of the five test drops. The test liquids used were water, 20:80 wt-% acetone:water, 50:50 wt-% acetone:water and the following Kit oil mixtures:

| Kit No. | Castor Oil (ml) | Tolune (ml) | Heptane (ml) |
| --- | --- | --- | --- |
| 1 | 100 | 0 | 0 |
| 2 | 90 | 5 | 5 |
| 3 | 80 | 10 | 10 |
| 4 | 70 | 15 | 15 |
| 5 | 60 | 20 | 20 |

The paper specimen used in the repellency evaluations was Whatman No. 42 filter paper, a sheet of which was immersed for two minutes in each sizing composition and dried prior to application of the above test liquids. The sizing compositions were as follows:

A. 1.012 grams of FC-829 in 49.040 grams of deionized water.

B. 0.376 gram of FC-829 in 49.626 grams of deionized water.

C. 2 parts by volume of Example II emulsion, 3 parts by volume of 1-butanol, 2 parts by volume of 2-propanol and 93 parts by volume of deionized water.

D. 0.385 grams of FC-829, 0.635 grams of Example II Emulsion and 49.01 grams of deionized water.

Following the procedure described above. The test paper specimens treated with each of the above sizing compositions A. to D. were tested against each test liquid and rated as follows:

| Test Liquid | A | B | C | D |
| --- | --- | --- | --- | --- |
| Water | 0 | 0 | 5 | 5 |
| 20% Acetone | 0 | 0 | 5 | 4.8 |
| 50% Acetone | 0 | 0 | 5 | 2 |
| Kit No. 1 | 5 | 5 | 5 | 5 |
| Kit No. 2 | 5 | 2.6 | 4.3 | 5 |
| Kit No. 3 | 5 | 2.6 | 4.3 | 4.8 |
| Kit No. 4 | 5 | 1.2 | 2.7 | 3.6 |
| Kit No. 5 | 5 | 0.2 | 0.7 | 1.8 |

As the foregoing ratings show, the invention composition (C) when used alone provides excellent resistance to water and polar solvents as compared to the fluorocarbon size (A, B). When used in combination with the fluorocarbon size (D), the invention composition permits use of substantially less of the expensive fluorocarbon size and imparts desirable resistance to oil and low surface tension fluids as well as water and polar solvent resistance, all of which properties do not obtain by the use of the fluorocarbon size alone.

When used to surface size paper or other nonwoven substrate, the invention composition is used in the form of an aqueous emulsion and is applied by any conventional surface sizing technique, e.g., by means of a size press or a size tub, or it can be applied by typically used spraying or coating techniques, or by calendar stack sizing.

A typical aqueous emulsion of the compositions of the invention contains about 35 weight percent of active solids, is nonionic has a pH of about 6.5 to 7.0, a specific gravity of about 0.983, a viscosity of about 20 cps at 23.8° C., and a boiling point of about 101° C.

Treatment level, of course, depends on the application procedure used and the surface properties required. For example, resistance to oil and low surface tension liquids typically requires a higher treatment level than resistance to water and polar solvents. Optimal treatment level can readily be determined, however, it is believed that from about 0.2 to about 6.0 pounds of invention composition per ton of dry fiber undergoing surface treatment, would typically be used.

As beforesaid, the invention composition is readily dispersible in water and forms very shear stable aqueous dispersions. Moreover, the invention composition has excellent compatibility with other typically used sizing additives, e.g., starch, polyvinyl alcohol, cellulose and latex and the like.

Although the invention has been described in some detail by the foregoing, it is to be understood that many variations can be made therein by those skilled in the art without departing from the spirit and scope thereof as defined by the appended claims.

We claim:

1. A composition comprising the reaction product of a melamine formaldehyde compound, at least one long chain alcohol and at least one long chain polyethoxylated alcohol.

2. The composition of claim 1 comprising the reaction product of from about 10 to about 30 weight percent of melamine formaldehyde compound having from 3 to 6 methoxymethyl groups, from about 20 to about 75 weight percent of long chain saturated alcohol and from about 5 to about 35 weight percent of long chain polyethoxylated alcohol.

3. The composition of claim 1 wherein the melamine formaldehyde compound is hexamethoxymethyl melamine, the long chain alcohol contains from 12 to 30 carbon atoms and the long chain polyethoxylated alcohol contains from 30 to 120 carbon atoms and from 5 to 50 ethylene oxide groups.

4. The composition of claim 3 wherein the long chain saturated alcohol is selected from stearyl alcohol, $C_{20}$ to $C_{24}$ alcohols or mixtures thereof and the long chain polyethoxylated alcohol is selected from polyethoxylated lauryl ether, polyethoxylated oleyl ether or mixtures thereof.

5. The composition of claim 4 comprising from about 30 to about 50 weight percent stearyl alcohol, from 0 to about 50 percent $C_{20}$ to $C_{24}$ alcohols, from about 5 to about 10 weight percent polyethoxylated lauryl ether or polyethoxylated oleyl ether and from about 15 to about 20 weight percent hexamethoxymethyl melamine.

6. The composition of claim 5 comprising about 37 to 38 weight percent stearyl alcohol, about 37 to 38 weight percent $C_{20}$ to $C_{24}$ alcohols, about 7 to 8 weight percent polyethoxylated oleyl ether and about 17.5 to 18.5 weight percent hexamethoxymethyl melamine.

7. In a method of treating a nonwoven substrate wherein a sizing composition is surface coated on the substrate to impart oil, water and polar solvent resistance thereto, wherein the improvement comprises using as the sizing composition, the composition defined in claim 1.

8. The improvement of claim 7 wherein the substrate is paper or paperboard.

9. In a method of treating a nonwoven substrate wherein a fluorocarbon sizing composition is surface coated on the substrate to impart oil resistance thereto, the improvement comprising replacing a substantial portion of the fluorocarbon sizing composition with a composition of claim 1.

10. The improvement of claim 9 wherein the substrate is paper or paperboard.

11. The composition of claim 1 wherein the long chain polyethoxylated alcohol contains from 30 to 120 carbon atoms and from 5 to 50 ethylene oxide groups.

* * * * *